(12) United States Patent
Aceves (10) Patent No.: US 8,751,594 B2
(45) Date of Patent: Jun. 10, 2014

(54) MESSAGING SYSTEM

(71) Applicant: LaVoult.com, LLC, San Diego, CA (US)

(72) Inventor: Fausto Aceves, San Diego, CA (US)

(73) Assignee: LaVoult.com, LLC, San Diego, CA (US)

( * ) Notice: Subject to any disclaimer, the term of this patent is extended or adjusted under 35 U.S.C. 154(b) by 0 days.

(21) Appl. No.: 13/668,233

(22) Filed: Nov. 3, 2012

(65) Prior Publication Data

US 2013/0117392 A1    May 9, 2013

Related U.S. Application Data

(60) Provisional application No. 61/556,787, filed on Nov. 7, 2011.

(51) Int. Cl.
G06F 15/16    (2006.01)

(52) U.S. Cl.
USPC .......................................................... 709/206

(58) Field of Classification Search
None
See application file for complete search history.

(56) References Cited

U.S. PATENT DOCUMENTS

| | | | |
|---|---|---|---|
| 6,108,688 A | 8/2000 | Nielsen | |
| 7,764,970 B2 | 7/2010 | Neil et al. | |
| 7,961,663 B2 | 6/2011 | Lin | |
| 2003/0229722 A1* | 12/2003 | Beyda | 709/310 |
| 2004/0249900 A1 | 12/2004 | Karstens | |
| 2004/0254998 A1 | 12/2004 | Horvitz | |
| 2006/0041484 A1 | 2/2006 | King et al. | |
| 2008/0016575 A1 | 1/2008 | Vincent et al. | |
| 2008/0080677 A1 | 4/2008 | Samdadiya et al. | |
| 2009/0003552 A1 | 1/2009 | Goldman et al. | |
| 2009/0248751 A1* | 10/2009 | Myman et al. | 707/200 |
| 2011/0145102 A1 | 6/2011 | King et al. | |
| 2011/0202598 A1 | 8/2011 | Evans et al. | |
| 2011/0246333 A9 | 10/2011 | King et al. | |

FOREIGN PATENT DOCUMENTS

| | | |
|---|---|---|
| EP | 0813161 A2 | 12/1997 |
| EP | 1762970 A | 3/2007 |
| WO | 2004021205 A2 | 3/2004 |
| WO | 2011101784 A1 | 8/2011 |

OTHER PUBLICATIONS

"Real gangsters prefer BlackBerry", PhoneArena Team, Mar. 26, 2009, Accessed on Sep. 27, 2011 through www.phonearena.com.

(Continued)

Primary Examiner — Scott Christensen
(74) Attorney, Agent, or Firm — The Mueller Law Office, P.C.

(57) ABSTRACT

Disclosed herein is a communication method between two or more users which involves using a single software application to switch between a first mode of electronic messaging and a second mode of electronic messaging. Both the first mode of electronic messaging and the second mode of electronic messaging are between a first electronic device associated with a first user and a second electronic device associated with a second user. In the first mode of messaging, inputs are received from the first user for composing a regular message which is then sent to the second user in data transmitted through a server and saved in a memory. In the second mode of messaging, inputs are received from the first user for composing a confidential message which is then sent to the second user in data transmitted through the server, and the data is irretrievable at a later time.

18 Claims, 5 Drawing Sheets

(56) References Cited

OTHER PUBLICATIONS

Dannenfeldt, "How BlackBerry Messenger Works", www.communication.howstuffworks.com, Accessed on Sep. 27, 2011.

Jacobsson, TigerText: The app for spies and cheaters, www.pcworld.com, Mar. 1, 2010, Accessed on Sep. 27, 2011 via www.msnbc.msn.com.

Sorrel, TigerText Deletes Text Messages from Receiver's Phone, www.wired.com, Mar. 1, 2010, Accessed on Sep. 27, 2011.

International Search Report and Written Opinion Dated Feb. 26, 2013 for PCT Application No. PCT/US2012/063463.

Office Action dated Jul. 1, 2013 for U.S. Appl. No. 13/668,230.

* cited by examiner

MESSAGING SYSTEM

CROSS REFERENCE TO RELATED APPLICATIONS

This application claims priority benefit to U.S. Provisional Application No. 61/556,787, entitled "Messaging System" filed Nov. 7, 2011, which is incorporated by reference in its entirety herein as if it was put forth in full below. This application is related to, U.S. patent application Ser. No. 13/668,230, "Messaging System," filed on even date herewith, owned by the assignee of the present application, and hereby incorporated by reference.

BACKGROUND

Application software, also known as an application or an "App", is a complete, self-contained program that performs a specific function directly for the user. Apps may be used to facilitate enterprise software, accounting software, office suites, graphics software, messaging and media players.

Messaging systems, such as instant messaging, Short Message System (SMS) and email, are typically text-based chatting communication between two or more people using a device such as a phone, PDA, laptop, personal computers or the like. The messages are conveyed over a network, such as the Internet.

In one currently available messaging App, a user may send a message to a recipient and specify a time span for that message to expire. When the time limit is reached, the message automatically deletes from the sender's device, recipient's device and server regardless of whether the message has been received or read. The messages are saved on the App's server which is purged every minute of the day. Another option in this messaging App, is the "delete on read" mode of operation which causes the message to delete itself 60 seconds after the recipient has opened the message.

Also currently available is a communication system that allows users with the same type of device and/or application to exchange messages in near real time utilizing a private server to transfer messages. This private server offers a secure means for the transmission of the message. In this system, a sender must know the recipient's PIN code which is an eight-digit letter/number code assigned to each device. In some applications, the sender and recipient must accept each other before this type of secure messaging may be engaged.

Emailing applications are available where an email return receipt may be requested. Recipients may block these automatic email return messages from being sent from their corresponding email application. These email applications may also have an option to retract an email message. Again, a recipient may block the automatic retraction of a message from their corresponding email application. The recipient may also set up their corresponding email application to provide a pop-up confirmation request for the recipient before the automatic retraction of a message.

In messaging systems available today, notifications for new messages are displayed when the user is logged into the App. Once a user logs out of the App, notifications for new messages are no longer displayed so the user is unaware of associated activity until logging back into the App.

SUMMARY

Disclosed herein is a communication method between two or more users. The method involves using a single software application to switch between a first mode of electronic messaging and a second mode of electronic messaging. Both the first mode of electronic messaging and the second mode of electronic messaging are between a first electronic device associated with a first user and a second electronic device associated with a second user. While in the first mode of messaging, inputs are received from the first user for composing a regular message which is then sent to the second user. The regular message is sent to the second user in data transmitted through a server and saved in a memory. While in the second mode of messaging, inputs are received from the first user for composing a confidential message which is then sent to the second user. The confidential message is sent to the second user in data transmitted through the server, and the data is irretrievable at a later time.

The present invention is better understood upon consideration of the detailed description below in conjunction with the accompanying drawings and claims.

DETAILED DESCRIPTION

The present invention is a messaging method for a recipient and a sender. Inputs for composing a first message are received from the sender. Inputs for a predetermined amount of time for the first message to expire are also received from the sender. The first message is sent to the recipient and stored in a memory associated with the sender. The electronic device of the recipient attempts to receive the first message. The first message is deleted from the electronic device of the recipient after the predetermined amount of time has expired. If the first message is not read by the recipient before the predetermined amount of time has expired, a non-delivery notification is created and sent to the sender.

In one embodiment, the first message is optionally deleted from the electronic device and memory after the predetermined amount of time has expired. The predetermined amount of time for the first message to expire may be, for example, 10 seconds, 1 minute, 1 hour, 1 day or 1 week.

The messaging method can also be used to send the same message to a list of users in a particular order. In this embodiment, a list of two or more recipients is created. If the first message is not read by the recipient before the predetermined amount of time has expired, the first message is sent to a second recipient in the two or more recipients without further input from the user. If the first message is not read by the second recipient before the predetermined amount of time has expired, the first message is sent to a third recipient in the two or more recipients without further input from the user.

The present invention provides a communication method between two or more users. The method involves using a single software application to switch between a first mode of electronic messaging and a second mode of electronic messaging. Both the first mode of electronic messaging and the second mode of electronic messaging are between a first electronic device associated with a first user and a second electronic device associated with a second user. While in the first mode of messaging, inputs are received from the first user for composing a regular message which is then sent to the second user. The regular message is sent to the second user in data transmitted through a server and saved in a memory, e.g., a permanent memory. While in the second mode of messaging, inputs are received from the first user for composing a confidential message which is then sent to the second user. The confidential message is sent to the second user in data transmitted through the server, and the data is irretrievable at a later time. A signal software application hosts both modes of messaging.

In one embodiment, the first user initiates the second mode of messaging, and the second user accepts a request to join the second mode of messaging before entering the second mode of messaging. The data is saved in a temporary memory which may be a random-access memory. The memory may be located remotely.

In the second mode of messaging, the confidential message is sent to the second user in data transmitted through the server and not permanently saved in any type of memory, history or database. Also, in one embodiment, during the second mode of messaging, received confidential messages cannot be forwarded or copied to any other user. This confidential message may be an instant message, a text message or other type of electronic message.

Furthermore, when the first user or the second user exits the first mode of messaging, the regular messages received or sent are retrievable from both the first and second devices. When the first user or the second user exits the second mode of messaging, the history of the confidential message on the first electronic device and on the second electronic device is deleted.

In another embodiment, the messaging system allows a user to receive new messages notifications on a device while logged out of the associated messaging system (aka being offline).

Figure 1:
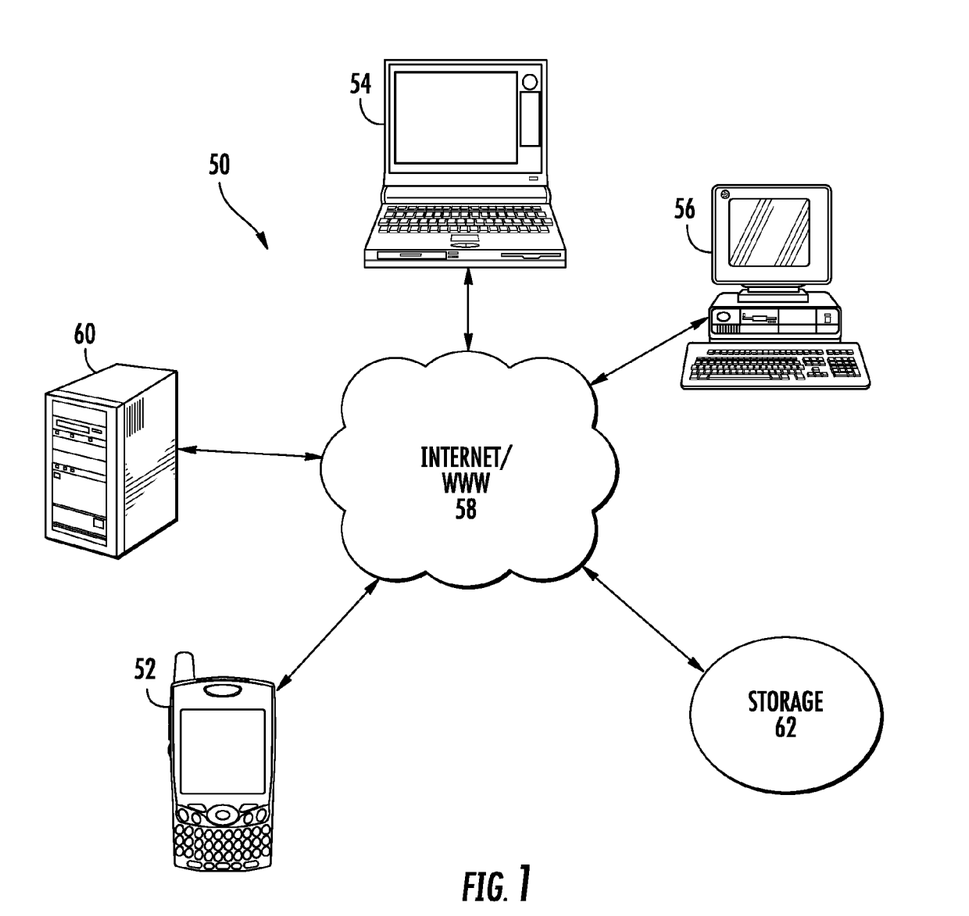
FIG. 1 illustrates an example network environment configuration for a messaging system.

FIG. 1 illustrates an example network environment configuration for a messaging system 50. An App, which is a software program, is downloaded to a first user's device and becomes the client on the device. The device may be a phone 52, PDA, laptop 54, personal computer 56 or the like. This client connects to the provider's server 60 through the Internet or the World Wide Web (Web) 58, using a proprietary protocol for communication. Once the first user logs into the App, the client sends server 60 the device's 52/54/56 connection information. Server 60 is any server capable of processing and storing data. In one embodiment, server 60 creates a temporary file in storage 62 with connection information for the first user and their respective contacts, i.e., other users. Storage 62 may be located in the same physical location of server 60, or it may be located physically away from server 60 as shown in FIG. 1. Server 60 then determines which respective contacts are logged into the App and sends that information to the first user, and optionally informs the respective contacts that the first user is logged into the App. From this point, server 60 is no longer involved in the communication link, and all communication is between the client on device 52/54/56 and a message recipient established through respective contacts. In another embodiment, server 60 remains in the communication channel.

Methods for Non-Delivery of Messages

Various messages are exchanged between users that may contain time sensitive information that will be of little to no value or interest to the recipient after a particular period of time has elapsed. However, with traditional personal messaging services, such time sensitive messages are still delivered and/or otherwise remain available to the recipient even after the particular time period has lapsed. Accordingly, when reviewing their messages after the particular time period has lapsed, the recipient can be undesirably burdened with having to view messages that are no longer meaningful or of little to no interest to the recipient and/or sender. Also, in many cases, if the recipient hasn't become aware of the message within a certain timeframe, the sender may desire to retract the message so the recipient never knows the content of the message.

The present invention provides a method for messaging between a sender and a recipient. In one embodiment, it is determined if a sent message is actually read by a recipient. To do so, inputs for composing a first message are received from the sender. A predetermined amount of time for the first message to expire is also received from the sender. The first message is sent to the recipient and stored in a memory associated with the sender. The electronic device of the recipient attempts to receive the first message. The first message is deleted from the electronic device of the recipient after the predetermined amount of time has expired. Optionally, if the first message is not read by the recipient before the predetermined amount of time has expired, a non-delivery notification is created and sent to the sender.

Figure 2:
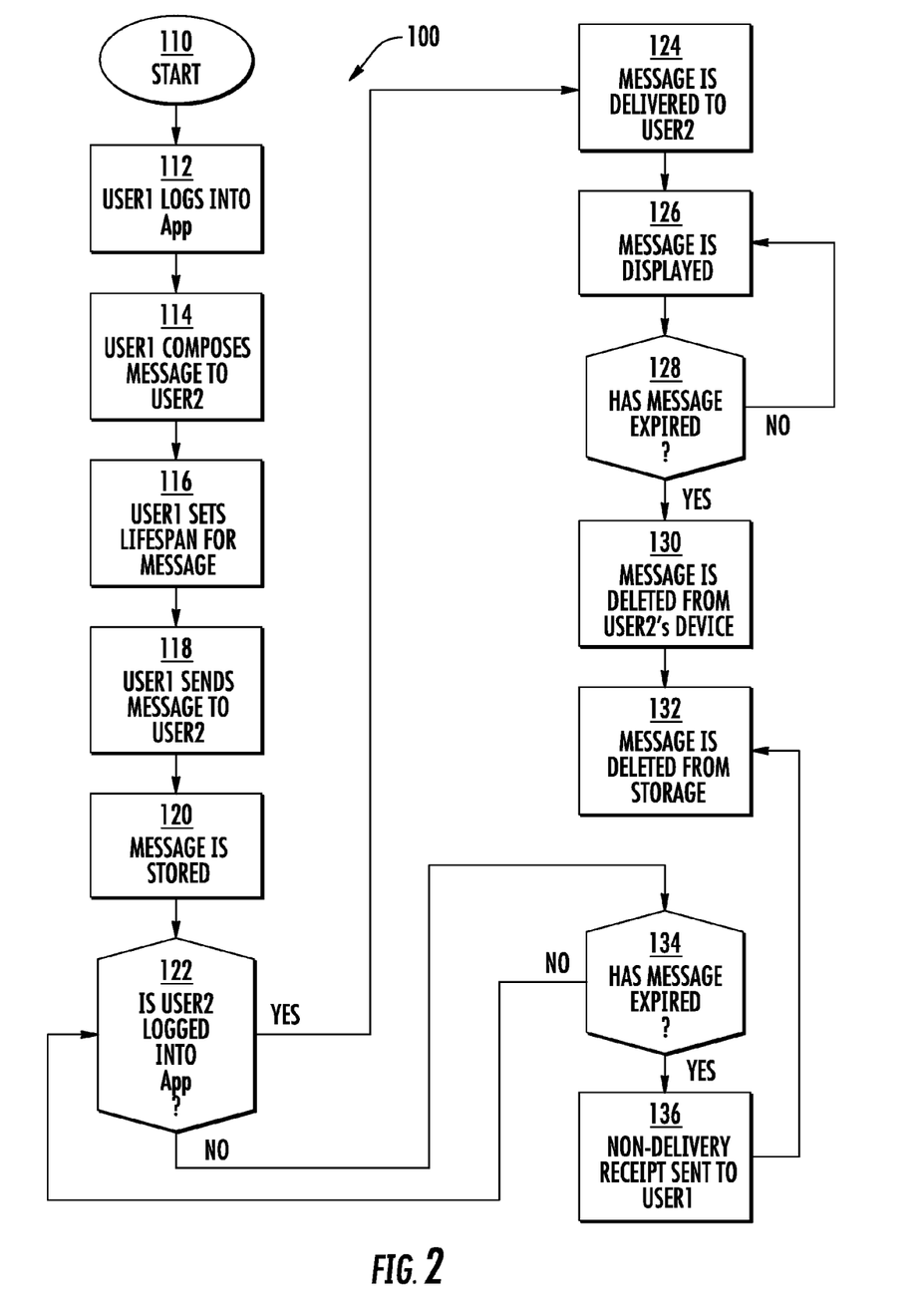
FIG. 2 provides an example flowchart of methods for non-delivery of messages.

This example embodiment provides methods for handling the non-delivery of messages. FIG. 2 provides an example flowchart of a method for non-delivery of messages 100. The process starts at step 110. At step 112, user1 logs into a specific App for a messaging system on a device. At step 114, inputs from the sender are received for composing a first message, i.e., user1 uses a device to compose a new message to user2. User1 then sets a lifespan for the new message to expire in a particular amount of time (step 116). The lifespan of a message is a predetermined amount of time that the message will remain available for user2 to access and read. At the end of the lifespan, or predetermined amount of time, the message expires. When this occurs, the message is no longer available for user2 to access and read or visible on user2's device. The predetermined amount of time for the first message to expire may be, for example, 10 seconds, 1 minute, 1 hour, 1 day or 1 week.

At step 118, user1 sends the message to user2. The message is stored in a memory associated with the sender, or user1, at step 120. This storage may be located locally or remotely, and it may be in a memory associated with a server, with database storage or the like. The memory may be, for example, a random access memory (RAM), or a type of read only memory (ROM) such as erasable programmable ROM (EPROM) or Flash ROM, hard drive or any such storage system typically used for storing computer related data. In one embodiment, the message is stored temporarily meaning it is overwritten over time.

An electronic device of the recipient attempts to receive the message. In one embodiment, the recipient is capable of receiving the message by an electronic device of the recipient. To do so, the system determines if user2 is logged into the App (step 122). If user2 is logged into the App, the message is delivered to user2 (step 124) and displayed on user2's device at step 126. The message is then available for user2 to access and read. When the message expires due to the lifespan constraint (step 128), then at step 130, the message is deleted from user2's device. In another embodiment, the message is also deleted from user1's device. In further embodiments, once the message expires, the user is alerted. For example, the deleted message in the session will be replaced with placeholder text or a graphic indicating that the message has expired. At step 132, the message is optionally deleted from storage. If however the message has not expired (step 128), the message continues to be displayed on user2's device and/or remains retrievable for display on user2's device.

Returning to step 122, if user2 is not logged into the App, then at step 134, the system determines if the message has expired due to the lifespan constraint. If the message has not expired, the process returns to step 122 and continues monitoring whether user2 is logged into the App and/or whether the message has expired. The process will continue in this loop until either user2 logs into the App or the message expires. If the message has expired at step 134, thus, has not read by the recipient before the predetermined amount of time has expired, a non-delivery receipt is generated and sent to user1 (step 136) and the message is optionally deleted from storage (step 132). If the message is deleted, the message will no longer be available in the user2 history for recall at a later date.

In the case where a non-delivery receipt is sent to user1 (step 136), user2 never read the message and may not have been aware that a message was pending. Because the message is deleted at step 132, user2 will not know the content of the message unless it's resent by user1. In another embodiment, in the case where a non-delivery receipt is sent to user1 (step 136), user2 receives a notification that a message was sent but expired and is now deleted and irretrievable. In this scenario, user2 is aware a message was sent but is unaware of the content of the message unless it's resent by user1.

In one embodiment of the present invention, user1 may create a list of two or more recipients (i.e., user2, user3, and user4) to send the message to in a certain order. If the first message is not read by the recipient before the predetermined amount of time has expired, the first message is sent to a second recipient in the two or more recipients without further input from the user. If the first message is not read by the second recipient before the predetermined amount of time has expired, the first message is sent to a third recipient in the two or more recipients without further input from the user. For instance, user1 logs into the App, composes a new message and sets a lifespan for the message to expire after a specified amount of time. User1 then sends the message to user2. If the message is not opened by user2 before the predetermined amount of time has expired, the message is automatically sent to a third user (user3) without input from user1. Then, if this message is not received by user3 before the predetermined amount of time has expired, the message is sent to a fourth user (user4) without further input from user1.

Each time the message is not opened/retrieved by a user in the list, a non-delivery notification may be optionally sent to user1 (the sender), and the message is deleted from the device of the user that didn't open the message before expiration. The message may also be deleted from the memory associated with it. This process continues until the end of the recipient list or until one of the recipients is logged into the App and opens the message.

This embodiment may be useful when, for example, scheduling a contractor for a job or a taxi driver for a pick-up. The following example is provided to demonstrate this embodiment but not limit the scope of the present invention.

A supervisor composes a message of, "Are you available to work tomorrow?", sets the message lifespan to 5 minutes then makes a list of four contractors to send the message to—Adam, Bob, Chris and Don. The message is first sent to Adam who is not logged into the App. After 5 minutes, a non-delivery receipt is sent to the Supervisor. The Supervisor is now aware that Adam never received the message and will have no notification of the work offer via that message. The message is automatically sent to the next contractor on the list, Bob. Bob is also not logged into the App. Again, after 5 minutes, a non-delivery receipt is sent to the Supervisor. Like Adam, Bob never receives the message. The message is automatically sent to the next contractor on the list, Chris. Chris is logged into the App, opens the message and responds to the Supervisor with a message of, "Yes, what time should I be over?" The process is ended and no message is sent to Don.

Communication System Using Both a Normal Mode and Confidential Mode

The present invention provides a dual-mode communication system between two or more users. The method involves using a single software application to switch between a first mode of electronic messaging and a second mode of electronic messaging. Both the first mode of electronic messaging and the second mode of electronic messaging are between a first electronic device associated with a first user and a second electronic device associated with a second user. While in the first mode of messaging, inputs are received from the first user for composing a regular message which is then sent to the second user. The regular message is sent to the second user in data transmitted through a server and saved in a memory. While in the second mode of messaging, inputs are received from the first user for composing a confidential message which is then sent to the second user. The confidential message is sent to the second user in data transmitted through the server, and the data is irretrievable at a later time.

Moreover, the communication system allows a user to switch between a normal mode of electronic messaging, where the messages are stored, to a confidential mode or private mode, where the messages are stored in a temporary manner. When messages are stored in a temporary manner, the messages can be overwritten over time, cannot be recalled at a later date and/or deleted in an automated manner. This may be desirable when a sender and recipient need complete confidentiality, for example, when the message contains sensitive content such as medical conditions, financial information, legal issues or the like. In traditional messaging systems, messages are transferred over a network and are typically stored and archived on a server in a permanent memory. These messages may then be recalled at a later date by the user.

Figure 3:
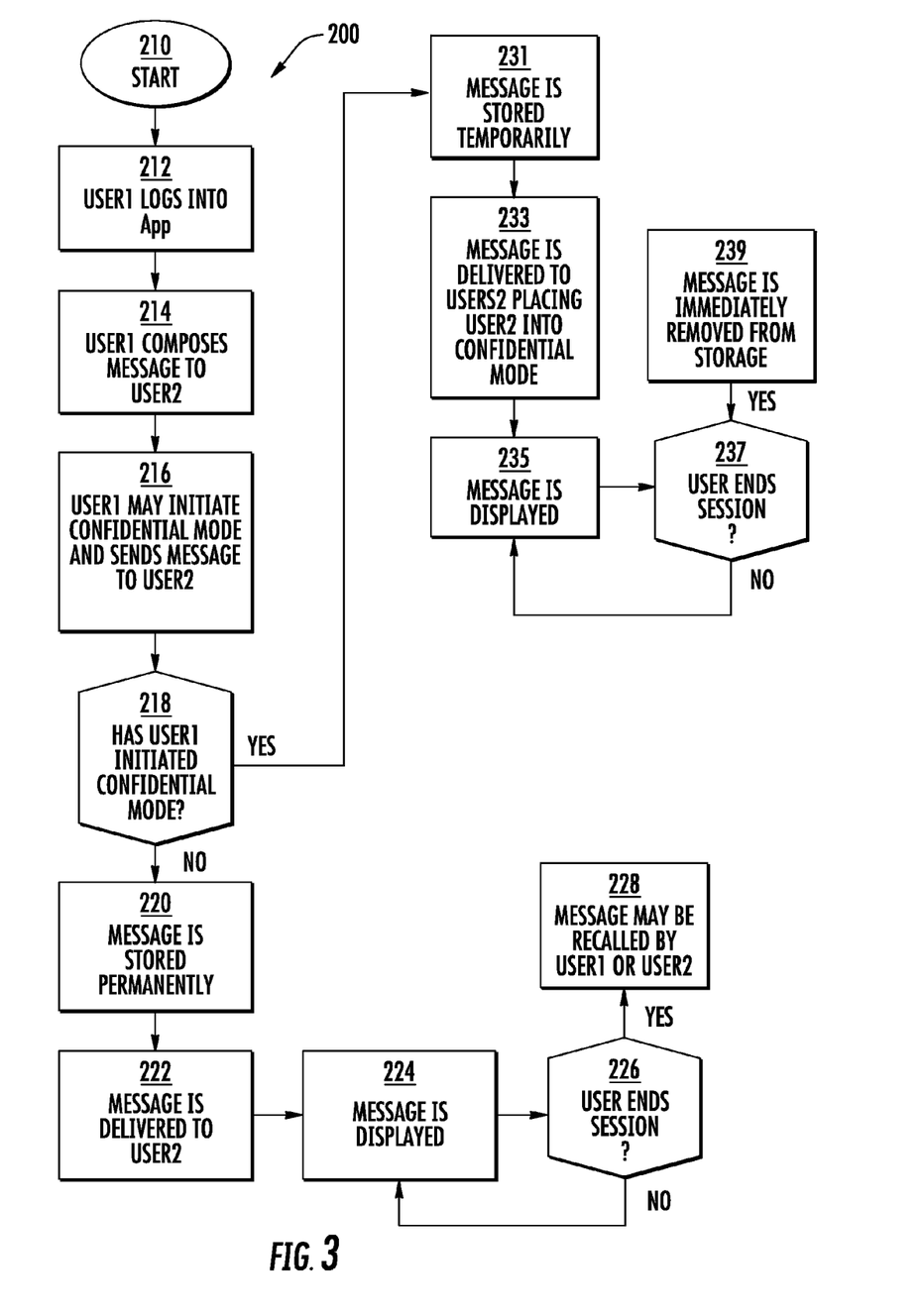
FIG. 3 provides a flowchart for an example of switching between a first mode of messaging and a second mode of messaging using a single software application.

FIG. 3 provides a flowchart for an example of switching between a first mode of messaging and a second mode of messaging in message system 200 using a single software application. Both the first mode of electronic messaging and the second mode of electronic messaging are between a first electronic device associated with a first user and a second electronic device associated with a second user In this example, the first mode of messaging is a normal mode of operation or regular mode, and the second mode of messaging is a confidential mode or private mode. The process starts at step 210. At step 212, user1 logs into the specific App for the communication method. At step 214, user1 composes a new, regular message to user2. At step 216, user1 sends the regular message to user2 without initiating confidential mode. At step 218, the system determines if confidential mode has been initiated. If confidential mode is not initiated, then the first mode of operation, normal mode or regular mode is used. The regular message is sent to the second user, or user2, in data transmitted through a server and saved in a memory. The regular message is stored at step 220. This storage may be located locally or remotely, and be in memory associated with a server, database storage, computer hard drive, network attached storage, or the like. In this example, the storage is in a permanent memory, so it will not be overwritten over time and may be recalled at a later date.

Assuming user2 is logged into the App, the message is delivered to user2 (step 222) and displayed on user2's device at step 224. When the first user or the second user exits the first mode of messaging, the regular messages received or sent are retrievable from both the first and second devices. At step 226, if either user ends the session, then at step 228, the message may be recalled by user1 or user2 at a later date. If the session is not ended, the message continues to be displayed on user2's device and optionally, on user 1's device.

Returning to step 216, this time when user1 sends the message to user2, confidential mode or private mode, is initiated. Confidential mode is the second mode of operation that can be activated by either user in this embodiment. When confidential mode is activated, the message is sent to the second user, or user2, in data transmitted through the server, and the data is irretrievable at a later time. The message is stored temporarily at step 231. This storage may be located locally or remotely, and it may be in any type of temporary memory such as a random access memory (RAM), Flash, or temporary disk storage. In this example, the storage is in a temporary memory such that it can be overwritten over time, and it cannot be recalled at a later date. In another embodiment, the confidential message is sent to the second user, or user2, in data transmitted through the server and not saved in any type of memory, history or database.

Assuming that user2 is logged into the App, at step 233, the message is delivered to user2 placing user2 automatically into confidential mode. In another embodiment, the second user, or user2, is automatically placed in the second mode of messaging upon opening the confidential message. In a further embodiment, when the first user, or user1, initiates the second mode of messaging, the second user, or user2, accepts a request to join the second mode of messaging before entering the second mode of messaging. For example, user2 may be prompted to accept confidential mode.

The message is displayed on user2's device at step 235. At step 237, if user1 ends the session, then at step 239, the message or messages on user1's device is immediately removed. When the second user ends the session, in this case user2, the message or messages on their device is immediately removed. In another embodiment, if one of the users ends the session, the message(s) is immediately removed on user1's and user2's devices. Also, the message or messages in storage are deleted and cannot be recalled by user1 or user2 at a later date. If the session is not ended, the message continues to be displayed.

In confidential mode, because the messages are stored temporarily and not in persistent storage and deleted when the session is ended, no messages remain in memory or in a history on any device or server after the session is ended. Therefore, no record of the electronic conversation exists. In another embodiment, during the second mode of messaging, received confidential messages cannot be forwarded or copied to any other user. This may be beneficial to insure the content of the confidential message is not revealed to any other user but the intended recipient. The form of the confidential message may be an instant message or a text message or the like.

The ability to switch between a normal mode of messaging and a confidential mode of messages within the same App may be useful when, for example, communicating restricted, secret or private content such as medical conditions, financial information, business plans, sensitive corporate data or legal issues.

Offline Notification

Figure 4:
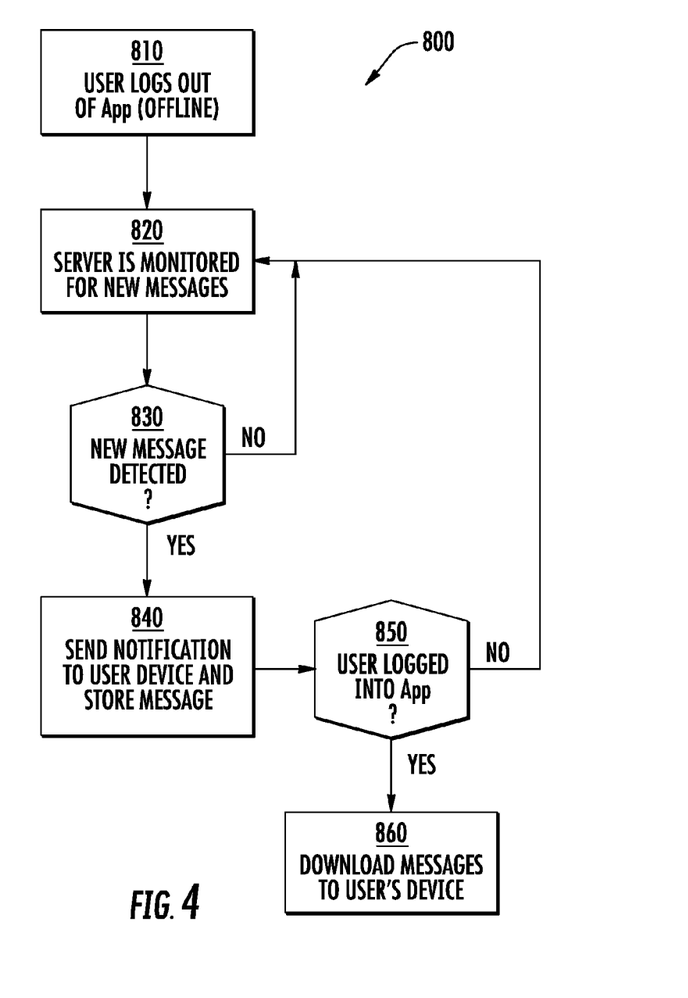
FIG. 4 depicts an example flowchart for offline notification.

Disclosed herein is a system with the ability for a user to receive notifications on a device for new messages received while logged out of the associated messaging system (aka being offline). FIG. 4 depicts an example flowchart process 800 for offline notification. Step 810 begins process 800 when the user logs out of the messaging App and is therefore offline. At step 820, the server is monitored outside of the App itself for incoming new messages being sent to that particular user. At step 830, if no new message is detected, the server continues to monitor. If a new message is identified, at step 840, a notification is sent to the user's device indicating a new message has been received.

Figure 5:
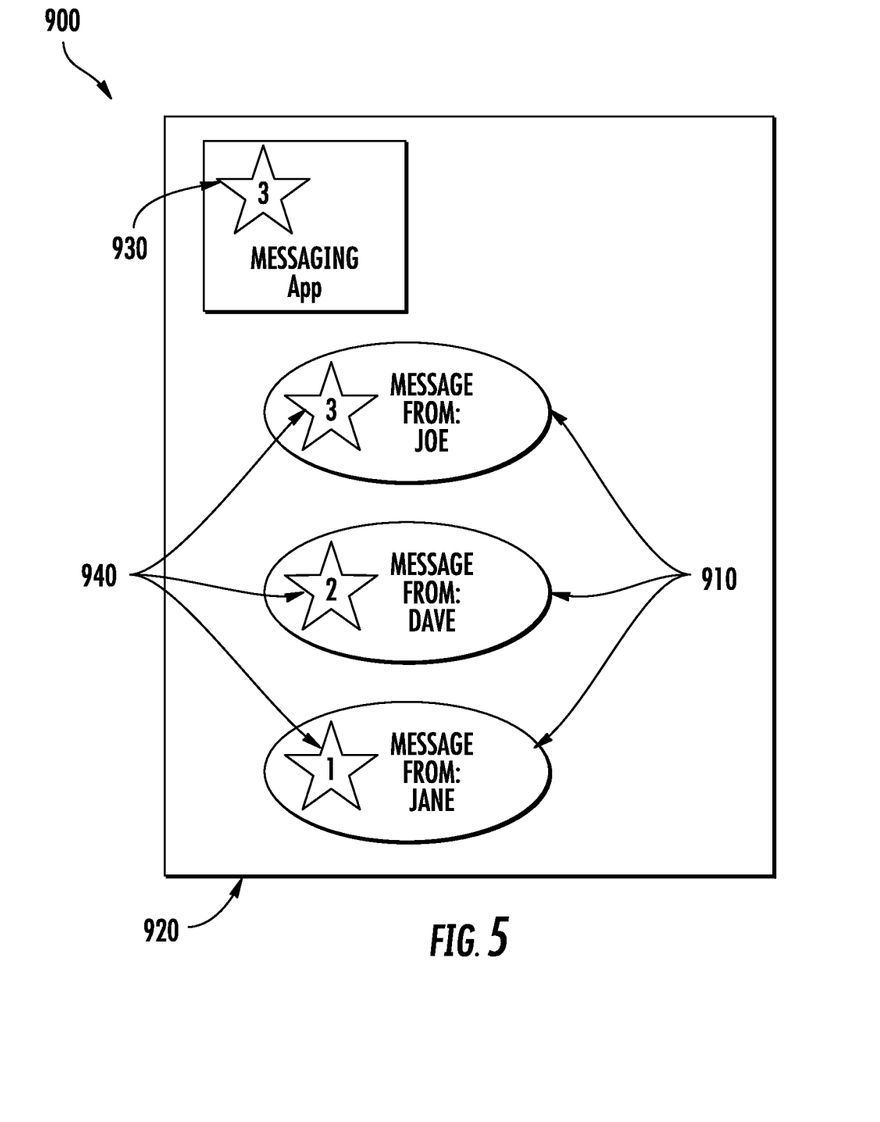
FIG. 5 illustrates an embodiment for a user interface during offline notification.

FIG. 5 illustrates an embodiment for a user interface during offline notification 900. The notification may be a pop-up window 910 on a user's device 920 indicating that a new message has been received. There may be several pop-up windows 910 which correspond to the amount of new messages received. The pop-up window 910 may include the sender's name as well as an indication on the App badge icon 930 that denotes the amount of new messages received which are waiting to be opened. These pop-up windows 910 may be sorted with the newest message first and may have a badge icon 940 with a new message count. In other embodiments, notification methods may include vibrating the device, sounding an alert tone or the like.

In further embodiments, the messages are sorted alphabetically, by subject or the like. After receiving a notification, the user can then choose whether to open the App, log in and read a message or simply remain logged out and continue to receive additional notifications for future messages. If the user logs back into the messaging App, the waiting messages may be automatically downloaded by the App and displayed on the appropriate user screen, separated by each user they were sent from.

Referring to FIG. 4, these new messages are stored on the server (step 840). At step 850, the user may log into the App and the pending messages are automatically downloaded by the App and displayed on the appropriate screen of the user's device (step 860) for review. The user may also choose to remain logged out of the App (step 850) and continue to receive additional notifications for future messages received.

While the specification has been described in detail with respect to specific embodiments of the invention, it will be appreciated that those skilled in the art, upon attaining an understanding of the foregoing, may readily conceive of alterations to, variations of, and equivalents to these embodiments. These and other modifications and variations to the present invention may be practiced by those of ordinary skill in the art, without departing from the spirit and scope of the present invention. Furthermore, those of ordinary skill in the art will appreciate that the foregoing description is by way of example only, and is not intended to limit the invention. Thus, it is intended that the present subject matter covers such modifications and variations.

What is claimed:

1. A communication method between two or more users, comprising the steps of:
switching between a first mode of electronic messaging and a second mode of electronic messaging while using a single software application, both the first mode of electronic messaging and the second mode of electronic messaging being between a first electronic device associated with a first user and a second electronic device associated with a second user;
receiving inputs from the first user for composing a regular message while in the first mode of messaging;
sending the regular message to the second user while in the first mode of messaging;
receiving inputs from the first user for composing a confidential message while in the second mode of messaging;

sending the confidential message to the second user while in the second mode of messaging; and automatically and without user intervention, deleting a history of the confidential message on the first electronic device and on the second electronic device based on at least one of the first user and the second user exiting the second mode of messaging, wherein the confidential message is only displayable before the history of the confidential message is deleted;

wherein while in the first mode of messaging, a regular message is sent to the second user in data transmitted through a server and saved in a memory; and wherein while in the second mode of messaging, the confidential message is sent to the second user in data transmitted through the server, the data being displayed until at least one of the first user and the second user exits the second mode of messaging.

2. The communication method of claim 1, wherein the data is saved in a temporary memory.

3. The communication method of claim 1, wherein while in the second mode of messaging, the confidential message is sent to the second user in data transmitted through the server and not saved in any type of memory, history or database.

4. The communication method of claim 1, wherein the first user initiates the second mode of messaging, and wherein the second user is automatically placed in the second mode of messaging upon opening the confidential message.

5. The communication method of claim 1, wherein the first user initiates the second mode of messaging, and wherein the second user accepts a request to join the second mode of messaging before entering the second mode of messaging.

6. The communication method of claim 1, wherein when the first user or the second user exits the first mode of messaging, the regular messages received or sent are retrievable from both the first and second devices.

7. The communication method of claim 1, wherein during the second mode of messaging, received confidential messages cannot be forwarded or copied to any other user.

8. The communication method of claim 1, wherein the temporary memory is a random-access memory.

9. The communication method of claim 1, wherein the confidential message is an instant message or a text message.

10. The method of claim 1, wherein the memory is located remotely.

11. A non-transitory computer readable medium storing a program that when executed by a processor performs a method, comprising the steps of:

switching between a first mode of electronic messaging and a second mode of electronic messaging while using a single software application, both the first mode of electronic messaging and the second mode of electronic messaging being between a first electronic device associated with a first user and a second electronic device associated with a second user;

receiving inputs from the first user for composing a regular message while in the first mode of messaging;

sending the regular message to the second user while in the first mode of messaging;

receiving inputs from the first user for composing a confidential message while in the second mode of messaging;

sending the confidential message to the second user while in the second mode of messaging; and automatically and without user intervention, deleting a history of the confidential message on the first electronic device and on the second electronic device based on at least one of the first user and the second user exiting the second mode of messaging, wherein the confidential message is only displayable before the history of the confidential message is deleted;

wherein while in the first mode of messaging, a regular message is sent to the second user in data transmitted through a server and saved in memory; and wherein while in the second mode of messaging, the confidential message is sent to the second user in data transmitted through the server, the data being displayed until at least one of the first user and the second user exits the second mode of messaging.

12. The non-transitory computer readable medium of claim 11, wherein the first user initiates the second mode of messaging, and wherein the second user is automatically placed in the second mode of messaging upon opening the confidential message.

13. The non-transitory computer readable medium of claim 11, wherein the first user initiates the second mode of messaging, and wherein the second user accepts a request to join the second mode of messaging before entering the second mode of messaging.

14. The non-transitory computer readable medium of claim 11, wherein when the first user or the second user exits the first mode of messaging, the regular messages received or sent are retrievable from both the first and second devices.

15. The non-transitory computer readable medium of claim 11, wherein during the second mode of messaging, received confidential messages cannot be forwarded or copied to any other user.

16. The non-transitory computer readable medium of claim 11, wherein the data is saved in a temporary memory, the temporary memory being a random-access memory.

17. The non-transitory computer readable medium of claim 11, wherein the confidential message is an instant message or a text message.

18. The non-transitory computer readable medium of claim 11, wherein the memory is located remotely.

* * * * *

UNITED STATES PATENT AND TRADEMARK OFFICE
CERTIFICATE OF CORRECTION

PATENT NO. : 8,751,594 B2  
APPLICATION NO. : 13/668233  
DATED : June 10, 2014  
INVENTOR(S) : Aceves Page 1 of 1

It is certified that error appears in the above-identified patent and that said Letters Patent is hereby corrected as shown below:

In the Claims

Column 9, line 7, claim 1, please make the following change:

second mode of messaging--;--[[,]]

Column 10, line 15, claim 11, please make the following change:

second mode of messaging--;--[[,]]

Signed and Sealed this
Twenty-sixth Day of August, 2014

Michelle K. Lee
*Deputy Director of the United States Patent and Trademark Office*